US011350315B2

United States Patent
Zhu et al.

(10) Patent No.: US 11,350,315 B2
(45) Date of Patent: May 31, 2022

(54) COMMUNICATION METHOD AND NETWORK DEVICE

(71) Applicant: HUAWEI TECHNOLOGIES CO., LTD., Guangdong (CN)

(72) Inventors: Fangyuan Zhu, Beijing (CN); Yan Li, Beijing (CN); Yang Xin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 59 days.

(21) Appl. No.: 16/864,585

(22) Filed: May 1, 2020

(65) Prior Publication Data
US 2020/0260330 A1    Aug. 13, 2020

Related U.S. Application Data

(63) Continuation of application No. PCT/CN2018/106589, filed on Sep. 20, 2018.

(30) Foreign Application Priority Data

Nov. 9, 2017  (CN) .......................... 201711095765.8

(51) Int. Cl.
H04W 28/16 (2009.01)
H04W 40/24 (2009.01)

(52) U.S. Cl.
CPC .......... H04W 28/16 (2013.01); H04W 40/24 (2013.01)

(58) Field of Classification Search
CPC ..... H04W 40/24; H04W 28/16; H04W 36/08; H04W 36/12; H04W 36/0011;
(Continued)

(56) References Cited

U.S. PATENT DOCUMENTS 10,638,367 B2 * 4/2020 Faccin .................. H04W 36/14
10,652,813 B2 * 5/2020 Shimojou ............. G06F 9/5077
(Continued)

FOREIGN PATENT DOCUMENTS

CN    106572516 A    4/2017
CN    106657194 A    5/2017
(Continued)

OTHER PUBLICATIONS

3GPP TS 23.501 V1.4.0 (Sep. 2017),3rd Generation Partnership Project,Technical Specification Group Services and System Aspects, System Architecture for the 5G System, Stage 2(Release 15), 151 pages.
(Continued)

Primary Examiner — Man U Phan
(74) Attorney, Agent, or Firm — Fish & Richardson P.C.

(57) ABSTRACT

This application provides a communication method and a network device. The communication method includes: obtaining, by a first network device, one or more priorities of one or more network slices in a first network slice set for providing a service to an application; and sending, by the first network device, a correspondence between the one or more priorities and the one or more network slices in the first network slice set to a second network device, where a terminal route selection policy on a terminal is updated based on the correspondence.

17 Claims, 7 Drawing Sheets

(58) Field of Classification Search
CPC ..... H04W 76/16; H04W 80/04; H04W 88/16; H04L 45/24; H04L 69/14; H04L 47/15; H04L 29/06; H04L 12/707
USPC .......................................................... 370/235
See application file for complete search history.

(56) References Cited

U.S. PATENT DOCUMENTS

| | | | | |
|---|---|---|---|---|
| 10,659,952 | B2* | 5/2020 | Wang | H04W 60/00 |
| 10,757,624 | B2* | 8/2020 | Jin | H04W 36/00835 |
| 10,791,508 | B2* | 9/2020 | Park | H04W 60/00 |
| 10,798,761 | B2* | 10/2020 | Baek | H04W 76/12 |
| 10,880,747 | B2* | 12/2020 | Hu | H04W 12/10 |
| 11,038,972 | B2* | 6/2021 | Lu | H04L 67/26 |
| 2019/0053146 | A1 | 2/2019 | Shimojou et al. | |
| 2019/0364495 | A1* | 11/2019 | Mildh | H04W 48/18 |
| 2020/0077327 | A1* | 3/2020 | Duan | H04W 8/02 |
| 2021/0112513 | A1* | 4/2021 | Chun | H04W 48/18 |

FOREIGN PATENT DOCUMENTS

| | | |
|---|---|---|
| CN | 106792739 A | 5/2017 |
| CN | 106792888 A | 5/2017 |
| CN | 106922002 A | 7/2017 |
| CN | 106954267 A | 7/2017 |
| CN | 107071782 A | 8/2017 |
| CN | 107223350 A | 9/2017 |
| CN | 107295609 A | 10/2017 |
| WO | 2017166988 A1 | 10/2017 |
| WO | 2017170690 A1 | 10/2017 |

OTHER PUBLICATIONS

Motorola Mobility et al.,"Application Function influence on slice selection",SA WG2 Meeting #122,S2-174262,San Jose Del Cabo, Mexico, Jun. 26-30, 2017, 5 pages.
PCT International Search Report and Written Opinion in International Application No. PCT/CN2018/106,589, dated Dec. 14, 2018, 17 pages (With English Translation).
Office Action issued in Chinese Application No. 201711095765.8 dated Apr. 9, 2020, 18 pages (With English Translation).
Extended European Search Report issued in European Application No. 18877030.9 dated Oct. 8, 2020, 7 pages.
EPO Communication pursuant to Article 94(3) EPC issued in European Application No. 18877030.9 dated Apr. 7, 2022, 7 pages.
InterDigital Inc, Deutsche Telekom, "Clarification on scope and access to NWDA," 3GPP TSG-SA WG2 Meeting #121, S2-173429, Hangzhou, P.R. China, May 15-19, 2017, 4 pages.

* cited by examiner

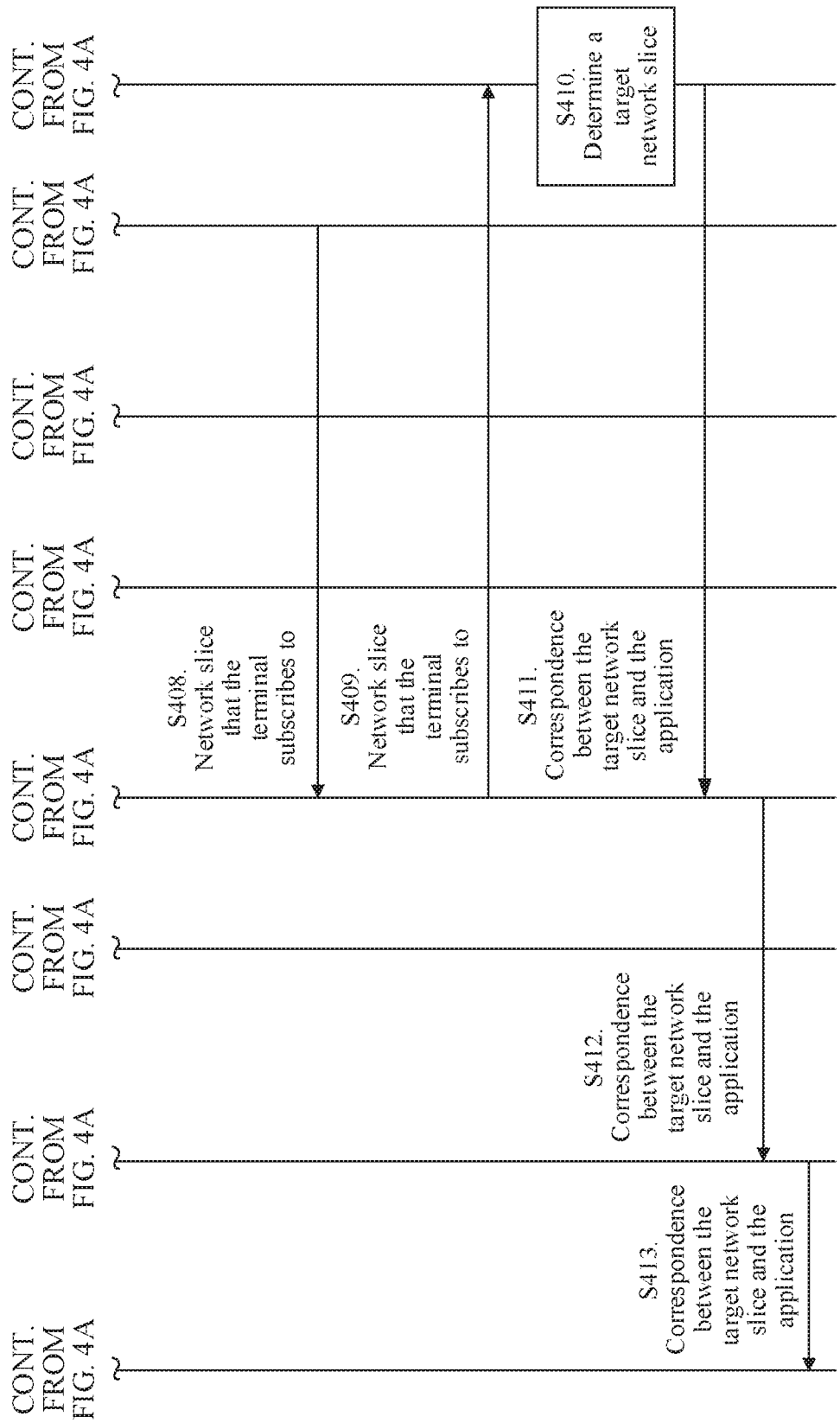

COMMUNICATION METHOD AND NETWORK DEVICE

CROSS-REFERENCE TO RELATED APPLICATIONS

This application is a continuation of International Application No. PCT/CN2018/106589, filed on Sep. 20, 2018, which claims priority to Chinese Patent Application No. 201711095765.8, filed on Nov. 9, 2017. The disclosures of the aforementioned applications are hereby incorporated by reference in their entireties.

TECHNICAL FIELD

This application relates to the communications field, and more specifically, to a communication method and a network device.

BACKGROUND

A growing quantity of devices, for example, tens of millions of internet of things devices, will access a communications network. These devices may belong to a plurality of different application scenarios. To meet requirements of the different application scenarios on the network, a network slicing technology emerges.

In the network slicing technology, network environments isolated from each other are provided to the different application scenarios in a manner of virtualizing independent logical networks on a same network infrastructure, so that network functions and features can be customized for the different application scenarios based on requirements of the application scenarios, and quality of service (QoS) requirements of different services can be ensured. The independent logical network virtualized on the network infrastructure may be referred to as a network slice.

When a terminal is attached to a network, a network slice selection process is triggered, so that an access network (AN) selects a proper access and mobility management function (AMF) network element for the terminal. The AMF network element may meet a type of a network slice that the UE requests to access. In the prior art, when the UE needs to initiate a session establishment procedure after registering with the network, a network side device preconfigures a network slice selection policy (NSSP) on the terminal. The NSSP includes a mapping relationship between an application and single network slice selection assistance information (S-NSSAI). Each piece of S-NSSAI identifies a type of network slice. When the terminal needs to send a data packet of an application, the terminal determines, based on the NSSP, S-NSSAI corresponding to the application, to provide the S-NSSAI to the AMF, so that the AMF selects a session management function (SMF) network element corresponding to a network slice identified by the S-NSSAI, and the SMF network element provides a service to the application.

The network slice corresponding to the application is selected based on the foregoing manner of configuring the NSSP. Consequently, a relatively good application service cannot be provided for the terminal, and user experience is affected.

SUMMARY

This application provides a communication method and a network device, to help a terminal select a better network slice to serve an application, thereby improving user experience.

According to a first aspect, this application provides a communication method. The communication method includes: obtaining, by a first network device, one or more priorities of one or more network slices in a first network slice set for providing a service to an application; and sending, by the first network device, a correspondence between the priorities and the network slices in the first network slice set to a second network device, where the correspondence is used to update a terminal route selection policy on a terminal.

In the communication method, the first network device obtains the priorities of the network slices for serving the application of the terminal, and sends the priorities to the second network device, so that the second network device can update the terminal route selection policy on the terminal based on the priorities. In this way, the terminal can select a better network slice for the application, thereby improving user experience.

With reference to the first aspect, in a first possible implementation, the obtaining, by a first network device, one or more priorities of one or more network slices in a first network slice set for providing a service to an application includes: obtaining, by the first network device, service experience of a first network slice serving the application; and obtaining, by the first network device, the priorities if the service experience is less than or equal to a service experience threshold.

In this implementation, only when service experience of a service provided to the application by a network slice currently allocated to the application of the terminal does not meet a requirement, the first network device obtains the priorities of the network slices for serving the application, and sends the priorities to the second network device, so that resources can be saved.

With reference to the first aspect or the first possible implementation, in a second possible implementation, the obtaining, by the first network device, the priorities includes: determining, by the first network device, the first network slice set associated with the application; and determining, by the first network device, the priorities based on service capabilities of the network slices in the first network slice set.

In this implementation, the first network device determines, based on the service capabilities of the network slices, the priorities of the network slices for serving the application. This helps improve priority accuracy of the network slices, and therefore, helps the second network device update the first network slice to a more proper network slice for the terminal. That is, user experience is further improved.

With reference to any one of the first aspect or the implementations, in a third possible implementation, the correspondence is a correspondence between the priorities and network slice selection assistance information of the network slices in the first network slice set.

With reference to any one of the first aspect or the implementations, in a fourth possible implementation, the first network device is a network data analytics network element, and the second network device is a control plane network element or a database network element.

According to a second aspect, this application provides a communication method. The communication method includes: receiving, by a second network device, from a first network device, a correspondence between one or more network slices in a first network slice set and one or more priorities of the network slices for providing a service to an application; determining, by the second network device for a terminal, a target network slice of the application in the first network slice set based on the correspondence between the priorities and the network slices in the first network slice set; and sending, by the second network device, a correspondence between the application and the target network slice to the terminal, where the correspondence between the application and the target network slice is used to update a terminal route selection policy on the terminal.

In this embodiment of this application, because the second network device determines, in the network slices those priorities have been determined, the target network slice for the application of the terminal, the second network device can determine, for the terminal, a network slice that can provide a better service, thereby improving user experience.

With reference to the second aspect, in a first possible implementation, the determining, by the second network device for a terminal, a target network slice of the application in the first network slice set based on the correspondence between the priorities and the network slices in the first network slice set includes: receiving, by the second network device, information about one or more network slices that the terminal subscribes to; and determining, by the second network device, the target network slice in the first network slice set based on the correspondence between the priorities and the network slices in the first network slice set and the information about the network slices that the terminal subscribes to.

In this implementation, the second network device determines, based on the information about the network slices that the terminal subscribes to, the target network slice for the application of the terminal in the network slices whose priorities have been determined, so that it can be ensured that the determined target network slice can improve a service for the application of the terminal, thereby helping improve reliability of serving the application of the terminal.

With reference to the second aspect, in a second possible implementation, the determining, by the second network device, a target network slice of the application in the first network slice set based on the correspondence between the priorities and the network slices in the first network slice set includes: determining, by the second network device, as the target network slice, a network slice with a highest priority in one or more network slices included in both the first network slice set and the network slices that the terminal subscribes to.

With reference to any one of the second aspect or the possible implementations, in a third possible implementation, the correspondence between the priorities and the network slices in the first network slice set is a correspondence between the priorities and network slice selection assistance information of the network slices in the first network slice set. Correspondingly, the correspondence between the application and the target network slice is a correspondence between the application and network slice selection assistance information of the target network slice.

With reference to any one of the second aspect or the possible implementations, in a fourth possible implementation, the first network device is a network data analytics network element, and the second network device is a control plane network element or a database network element.

According to a third aspect, this application provides a network device. The network device includes a module configured to perform the communication method in any one of the first aspect or the possible implementations of the first aspect. The module included in the network device may be implemented by software and/or hardware.

According to a fourth aspect, this application provides a network device. The network device includes a module configured to perform the communication method in any one of the second aspect or the possible implementations of the second aspect. The module included in the network device may be implemented by software and/or hardware.

According to a fifth aspect, this application provides a network device. The network device includes a processor and a transceiver. The processor is configured to execute a program. When the processor executes code, the processor and the transceiver implement the communication method in any one of the first aspect or the possible implementations of the first aspect.

Optionally, the network device may further include a memory. The memory is configured to store the program and data.

According to a sixth aspect, this application provides a network device. The network device includes a processor and a transceiver. The processor is configured to execute a program. When the processor executes code, the processor and the transceiver implement the communication method in any one of the second aspect or the possible implementations of the second aspect.

Optionally, the network device may further include a memory. The memory is configured to store the program and data.

According to a seventh aspect, this application provides a computer-readable storage medium. The computer-readable storage medium stores program code to be executed by a network device. The program code includes an instruction used to perform the communication method in any one of the first aspect or the possible implementations of the first aspect.

According to an eighth aspect, this application provides a computer-readable storage medium. The computer-readable storage medium stores program code to be executed by a network device. The program code includes an instruction used to perform the communication method in any one of the second aspect or the possible implementations of the second aspect.

According to a ninth aspect, this application provides a computer program product including an instruction. When the computer program product is run on a network device, the network device is enabled to perform the communication method in any one of the first aspect or the possible implementations of the first aspect.

According to a tenth aspect, this application provides a computer program product including an instruction. When the computer program product is run on a network device, the network device is enabled to perform the communication method in any one of the second aspect or the possible implementations of the second aspect.

According to an eleventh aspect, this application provides a system chip. The system chip includes an input/output interface, at least one processor, at least one memory, and a bus. The at least one memory is configured to store an instruction, and the at least one processor is configured to invoke the instruction in the at least one memory, to perform operations of the communication method in the first aspect or the second aspect.

BRIEF DESCRIPTION OF DRAWINGS

FIG. 4A and FIG. 4B are a schematic interaction diagram of a communication method according to another more specific embodiment of this application:

DESCRIPTION OF EMBODIMENTS

The following describes technical solutions in this application with reference to the accompanying drawings.

Figure 1:
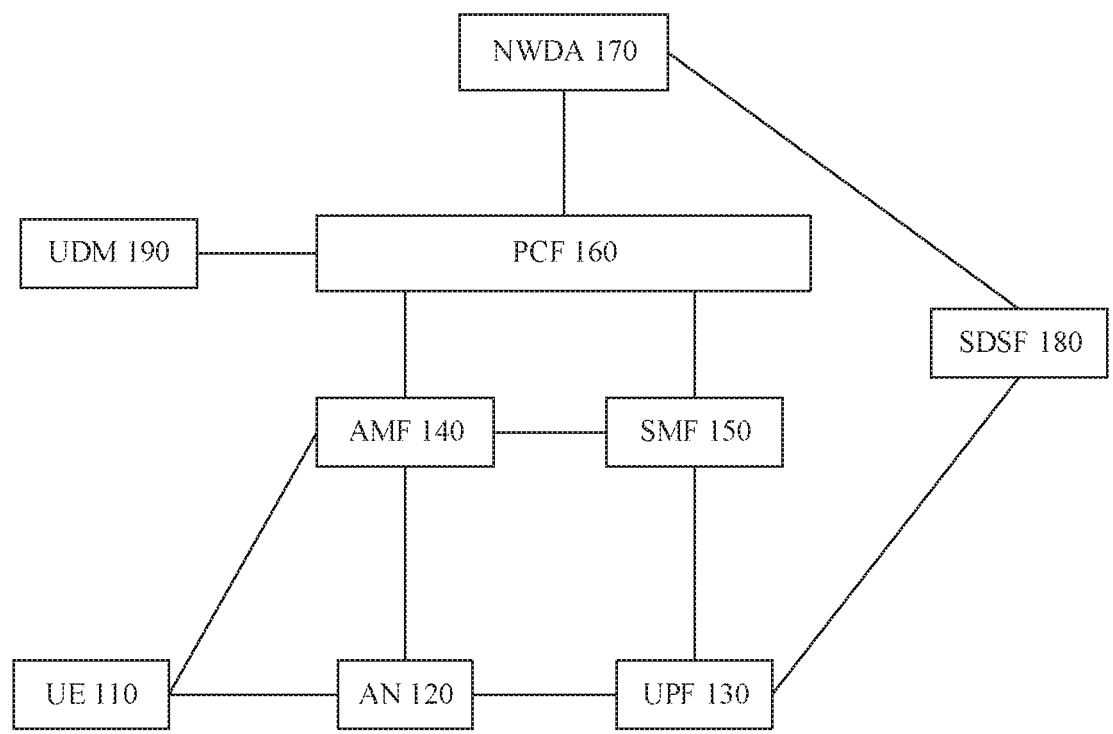
FIG. 1 is a schematic architectural diagram of a communications system of a communication method according to an embodiment of this application.

As shown in FIG. 1, a communications system of a communication method according to an embodiment of this application may include a user device (UE) 110, an access network (AN) device 120, a user plane function (UPF) network element 130, an AMF network element 140, an SMF network element 150, a policy control function (PCF) network element 160, a network data analytics (NWDA) network element 170, a structured data storage function (SDSF) network element 180, and a unified data management (UDM) network element 190.

The UE 110 may also be referred to as a terminal 110. The terminal 110 may communicate with one or more core networks (CN) through the AN device 120. The terminal may be referred to as an access terminal, a terminal device, a subscriber unit, a subscriber station, a mobile station, a remote station, a remote terminal, a mobile device, a user terminal, a radio network device, a user agent or a user apparatus. The terminal may be a cellular phone, a cordless phone, a session initiation protocol (SIP) phone, a wireless local loop (WLL) station, a personal digital assistant (PDA), a handheld device having a wireless communication function, a computing device, another device connected to a wireless modem, a vehicle-mounted device, a wearable device, a terminal device in the internet of things or a vehicle network, any form of terminal device in a future network, or the like.

The AN device 120 may be specifically a radio access network (RAN) device.

An example of the AN device 120 is a base station (BS). The base station may also be referred to as a base station device, is a device that connects a terminal to a wireless network, and includes but is not limited to: a transmission reception point (TRP), a 5G NodeB (gNB), an evolved NodeB (eNB), a radio network controller (RNC), a NodeB (NB), a base station controller (BSC), a base transceiver station (BTS), a home NodeB (for example, a home evolved NodeB or a home NodeB, HNB), a baseband unit (BBU), a Wi-Fi access point (AP), a small cell device (pico), or the like.

It should be understood that a specific type of the base station is not limited in the embodiments of this application. In systems using different radio access technologies, names of devices having functions of the base station may be different. For ease of description, in all the embodiments of this application, all the foregoing apparatuses that provide a wireless communication function for the terminal are collectively referred to as a base station.

The UPF network element 130 has functions such as packet forwarding, encapsulation, and statistics collection of the terminal.

The AMF network element 140 is responsible for access and mobility management of the terminal. For example, the access and mobility management includes mobility status management, temporary identity allocation of the terminal, terminal authentication and authorization, and the like.

The SMF network element 150 is responsible for UPF network element selection and reselection, IP address assignment, and the like, and may be further responsible for session establishment, modification, and release. QoS control, and the like.

The PCF network element 160 may be configured to implement functions such as policy control decision, flow-based charging control, terminal subscription data management, or QoS control.

The NWDA network element 170 may analyze network-level data, and notify another network element of a data analysis result by using the SDSF network element 180. The network-level data includes data generated, stored, and managed by a core network.

The SDSF network element 180 may store structured data. For example, the structured data includes at least one of application policy data, network topology data, and big data analysis data in a network. The SDSF network element 180 may be configured to implement capability exposure inside or outside a network.

The UDM 190 is responsible for storing and managing subscription data. When the subscription data is modified, the UDM 190 is responsible for notifying a corresponding network element, for example, notifying the PCF network element 160.

It should be understood that the embodiments of this application are not limited to the system architecture shown in FIG. 1. In addition, the device or the network element shown in FIG. 1 may be hardware, or may be software divided based on functions, or a combination thereof.

Figure 2:
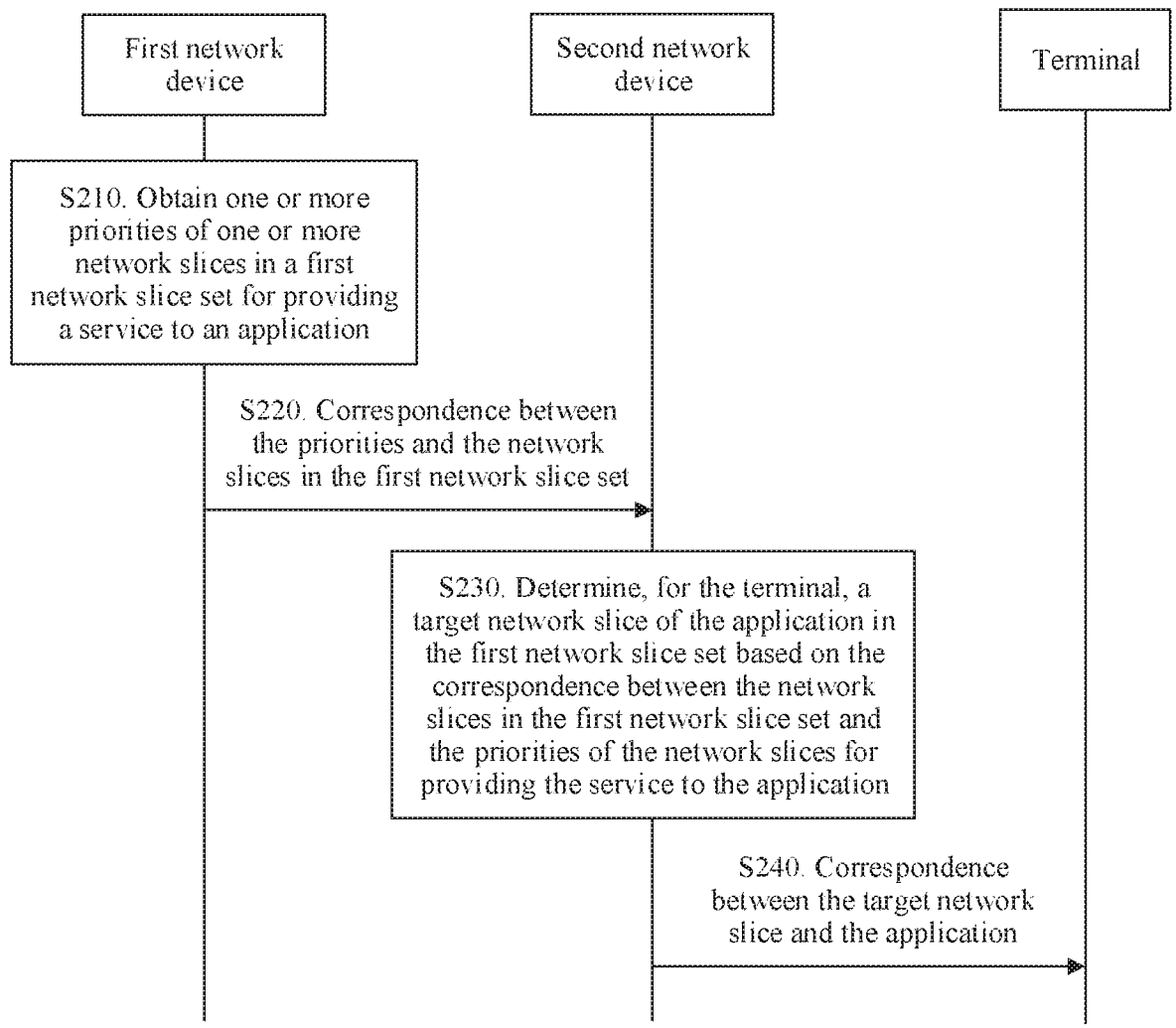
FIG. 2 is a schematic interaction diagram of a communication method according to an embodiment of this application.

FIG. 2 is a schematic interaction flowchart of a communication method according to an embodiment of this application. It should be understood that FIG. 2 shows steps or operations of the communication method, but these steps or operations are merely examples. In this embodiment of this application, other operations or variations of the operations in FIG. 2 may alternatively be performed. In addition, the steps in FIG. 2 may be performed in a sequence different from that presented in FIG. 2, and possibly not all the operations in FIG. 2 need to be performed.

The communication method shown in FIG. 2 may include S210, S220, S230, and S240.

S210. A first network device obtains one or more priorities of one or more network slices in a first network slice set for providing a service to an application (APP).

The first network device may be the NWDA network element 170 shown in FIG. 1. The application may be a video application, a voice application, a payment application, or the like.

The network slice may be understood as: An operator needs to provide connections and communication services with different functions and QoS to meet requirements of various industries in different scenarios. To reduce technical implementation complexity, in a communications network, an entire network resource is sliced by using a virtualization technology, and communication services with different connection capabilities are deployed on different network slices, so that a virtual independent logical network including a control plane network function and a user plane network function of a core network can be implemented, to meet QoS requirements of different services. In this manner of performing logical isolation on one physical infrastructure by using slices, resource utilization efficiency and flexibility can be improved.

The first network slice set is a set including network slices that can provide a service to the application in the network. The first network slice set may include one or more network slices.

In S210, that a first network device obtains one or more priorities of one or more network slices in a first network slice set for providing the service to an application may include: The first network device obtains service experience of a first network slice serving the application; and the first network device obtains the priorities if the service experience is less than or equal to a service experience threshold.

The first network slice may be understood as a network slice that currently serves the application for the terminal. In other words, the first network slice is a network slice that is currently configured on the terminal and that corresponds to the application.

Service experience of different applications may be measured by using different feature values. For example, service experience of the video application may be measured by using video quality (video mean opinion score, VMOS); service experience of the voice application may be measured by using voice quality (mean opinion score, MOS); and service experience of the payment application may be measured by using a delay in a process in which the terminal uses the payment application.

The voice application is used as an example. A MOS value is a common method for testing wireless voice quality. The MOS value may be used to describe a subjective opinion value of the wireless voice quality. A user may score quality of a received voice in a subjective scoring manner.

Table 1 shows an example of scoring according to a level defined in the ITU-TP.800 standard.

TABLE 1

Score table of a MOS value of a voice application

| MOS value level | MOS value | User satisfaction |
|---|---|---|
| Excellent | 4.0 to 5.0 | Perfect: A voice is clear, a delay is short, and communication is smooth. |
| Good | 3.5 to 4.0 | Good: A voice is clear and a delay is short, but communication is not so fluent, and few noises occur. |
| Medium | 3.0 to 3.5 | Medium: A voice is unclear and there is a delay, but communication is maintained. |
| Poor | 1.5 to 3.0 | Poor: A voice is unclear, a delay is relatively long, and repeated communication is required. |
| Bad | 0 to 1.5 | Bad: A voice cannot be heard, a delay is long, and communication cannot be normally performed. |

In an example, when a MOS value of the voice application is less than 3.5 or equal to 3.5, the first network device considers that user experience of the application is poor, and the first network device is triggered to obtain one or more priorities of one or more network slices for serving the application.

Score examples of the VMOS are similar to those of the MOS. Details are not described herein.

Optionally, that the first network device obtains service experience of a first network slice serving the application may include: The first network device obtains network data, where the network data includes a correspondence between the terminal and the first network slice; the first network device obtains the service experience of the terminal for the application; and the first network device associates the network data with the service experience, to obtain the service experience of the first network slice serving the application.

For example, the terminal stores a terminal route selection policy (UE Route Selection Policy, URSP) including an NSSP, the NSSP includes a correspondence between an application and a network slice (that is, the first network slice), and an identifier of the network slice may be represented by S-NSSAI. When the application of the terminal needs to transmit data, the terminal initiates a session establishment procedure, and sends, to a network device (for example, an AMF network element), S-NSSAI associated with the application. In this way, network data associated with the S-NSSAI is generated in the network, and the S-NSSAI is associated with the terminal that sends the S-NSSAI.

For example, when the terminal uses the video application, the terminal may initiate a session establishment request based on an association relationship that is between the video application and S-NSSAI of the first network slice and that is included in the NSSP stored on the terminal, where the request carries the S-NSSAI of the first network slice. In this way, the network data associated with the S-NSSAI is generated in the network.

When the first network device obtains the network data, optionally, the first network device may obtain the network data from at least one of the following network devices: an AMF network element, UE, an AN network element, and an SMF network element.

For example, the network data from the SMF network element may include a session management context of the terminal. For example, the network data from the SMF network element may include an internet protocol (IP) address of the terminal and the S-NSSAI carried in the session establishment request.

For example, the network data from the AMF network element may include a mobility management context of the terminal, for example, an identifier of the terminal, a type of the terminal, and a location of the terminal.

Optionally, the first network device may subscribe to the AMF network element and/or the SMF network element, and receive the network data periodically reported by the AMF network element and/or the SMF network element.

Alternatively, optionally, an SDSF network element may collect the network data from at least one of the AMF network element, the UE, the AN network element, and the SMF network element, and then the SDSF network element reports the network data to the first network device.

When the first network device obtains the service experience of the terminal for the application, the first network device may directly receive the service experience from a third-party application platform, or a third-party application platform may forward the service experience to the first network device by using another network device, for example, a network exposure function (NEF) network element. The third-party application platform may include an Over The Top (OTT) service center, a vertical management and control center, an operator platform, a third-party service server, or the like.

For example, after the terminal initiates the session establishment request of the video application and a session is successfully established, a data flow of the video application is forwarded to the terminal by using the first network slice. Then, the third-party platform may obtain a degree of satisfaction fed back by the user for a service provided by the first network slice to the video application.

Optionally, the service experience may be included in service data. To be specific, the first network device collects the service data from the third-party application platform, and the service data includes the service experience. The service data may further include one or more of the following information: an IP address of the terminal, an application identifier, an IP 5-tuple, a size of a data packet, a time of the data packet, whether the data packet is in uplink or in downlink, a service type, and an extension field.

Optionally, the degree of satisfaction fed back by the user may be the service experience. Alternatively, the user may feed back a user opinion, and the third-party platform may determine the service experience of the user for the service based on a correspondence between a user opinion and service experience. Alternatively, the third-party platform may send a user opinion to the first network device, and then the first network device determines the service experience of the user for the service based on a correspondence between a user opinion and service experience.

Optionally, the network data obtained by the first network device may include a correspondence between the first network slice and at least one of the identifier of the terminal or the IP address of the terminal, for example, a correspondence between the S-NSSAI of the first network slice and the at least one of the identifier of the terminal or the IP address of the terminal. When obtaining the service data, the first network device may specifically obtain a correspondence among the IP address of the terminal, the service experience, and the application. In this way, the first network device may associate the first network slice with the application and the service experience based on the network data including the IP address of the terminal, to obtain the service experience of the first network slice providing the service to the application.

Table 2 shows an example in which the first network device obtains, according to the foregoing method, service experience of a plurality of network slices on a plurality of terminals providing services to a plurality of applications.

TABLE 2

Correspondence among a terminal, an application, a network slice, and service experience

| Terminal | Application | Network slice | Service experience (a MOS/VMOS value) |
|---|---|---|---|
| UE 1 | APP 1 | S-NSSAI-1 | Value 1 |
| UE 2 | APP 1 | S-NSSAI-2 | Value 2 |
| UE 1 | APP 2 | S-NSSAI-1 | Value 3 |
| UE 2 | APP 2 | S-NSSAI-1 | Value 4 |

The first network device may prestore MOS/VMOS thresholds, corresponding to service experience, of various applications. In this way, after obtaining an actual MOS/VMOS value of the service experience when the first network slice provides the service to the application, the first network device may compare the actual MOS/VMOS value of the service experience with a corresponding service experience MOS/VMOS threshold. If the actual MOS/VMOS value of the service experience is less than the corresponding service experience MOS/VMOS threshold, the first network device obtains the priorities of the network slices for providing the service to the application; otherwise, the first network device may not obtain the priorities. This implementation can save resources.

For example, a MOS/VMOS threshold of the service experience of the video application is 3.5. If an actual MOS/VMOS value, obtained by the first network device, of the service experience of the video application is 2.0, the first network device considers that the service experience of the user is relatively poor, and the first network device may be triggered to obtain the priorities. If an actual MOS/VMOS value, obtained by the first network device, of the service experience of the video application is 4, the first network device considers that the service experience of the user is relatively good, and the first network device may not be triggered to obtain the priorities.

After determining to obtain the service priorities of the network slices for the application, the first network device needs to first determine the first network slice set associated with the application.

For example, the first network device obtains a slice capability of a network slice type deployed in the network, and then determines a type of a network slice that can provide the service to the application in the network. For example, the first network device may obtain, from a network management system, a slice type deployed in a current public land mobile network (PLMN) and a slice capability corresponding to each slice type. The slice capability is at least one of a service type, a QoS parameter (for example, a delay and a packet loss rate), and the like that can be provided by a slice. The slice capability may also be referred to as a service capability. These network slices that can provide the service to the application form the first network slice set.

After determining the first network slice set, the first network device may determine the priorities of these network slices for serving the application. For example, the first network device supports a big data analytics capability, determines, by using the big data analytics capability, the first network slice set associated with the application, and determines a priority of each network slice in the first network slice set for serving the application.

Table 3 shows an example of the priorities that are obtained by the first network device and that are of the network slices for providing the service to the application. The network slice is represented by S-NSSAI.

TABLE 3

Table of a priority of a network slice for providing a service to an application

| Application | Network slice | Priority |
|---|---|---|
| App 1 | S-NSSAI-1 | High |
|  | S-NSSAI-2 | Medium |
|  | S-NSSAI-3 | Low |
| App 2 | S-NSSAI-1 | High |
|  | S-NSSAI-3 | Medium |
|  | S-NSSAI-4 | Low |
| App 3 | S-NSSAI-3 | High |
|  | S-NSSAI-2 | Medium |
|  | S-NSSAI-1 | Low |

TABLE 3-continued

Table of a priority of a network slice for
providing a service to an application

| Application | Network slice | Priority |
|---|---|---|
| App 4 | S-NSSAI-2 | High |
|  | S-NSSAI-1 | Medium |
|  | S-NSSAI-3 | Low |

For example, the APP 1 is used as an example. In Table 3, network slices identified by the S-NSSAI-1, the S-NSSAI-2, and the S-NSSAI-3 can support a QoS requirement of the APP 1. Therefore, the first network device associates the APP 1 with the network slices identified by the S-NSSAI-1, the S-NSSAI-2, and the S-NSSAI-3. Further, the first network device then prioritize, based on big data analytics and QoS capabilities supported by the network slices identified by the S-NSSAI-1, the S-NSSAI-2, and the S-NSSAI-3, the network slices identified by the S-NSSAI-1, the S-NSSAI-2, and the S-NSSAI-3.

In an implementation method, the first network device obtains network data and service data of different terminals in the network, to obtain service data and network data that includes an association between the S-NSSAI-1 and the APP 1, an association between the S-NSSAI-2 and the APP 1, and an association between the S-NSSAI-3 and the APP 1. The first network device separately obtains actual MOS/VMOS values V1, V2, and V3 of service experience when the S-NSSAI-1, the S-NSSAI-2, and the S-NSSAI-3 are associated with the APP 1, where V1>V2>V3, and the first network device determines that a priority when the S-NSSAI-1 is associated with the APP 1 is "high", a priority when the S-NSSAI-2 is associated with the APP 1 is "medium", and a priority when the S-NSSAI-3 is associated with the APP 1 is "low".

Optionally, when the first network device determines the priorities of the network slices for serving the application, the first network device may further determine, for the application based on network congestion statuses of the network slices when the network slices serve, in different time periods, the terminal in different regions, priorities of the network slices for serving, in different time periods, the terminal in different regions.

The network data obtained by the first network device may include the network congestion statuses of the network slices for providing, in different time periods, the service to the terminal in different regions. In this case, the first network device may determine, based on the network congestion statuses of the network slices, the priorities of the network slice for providing, in different time periods, the service to the application on the terminal in different regions.

Table 4 shows an example of the priorities that are determined by the first network device and that are of the network slices for providing, in different time periods, the service to the application on the terminal in different regions. The network slice is represented by S-NSSAI of the network slice.

TABLE 4

Table of a priority of a network slice for providing,
in different time periods, a service to an application
on a terminal in different regions

| Time | Region | Application | Network slice | Priority |
|---|---|---|---|---|
| 7:00 to 19:00 | Haidian district | APP 1 | S-NSSAI-1 | High |
|  |  |  | S-NSSAI-2 | Medium |
|  |  |  | S-NSSAI-3 | Low |
|  |  | APP 2 | S-NSSAI-1 | High |
|  |  |  | S-NSSAI-3 | Medium |
|  |  |  | S-NSSAI-4 | Low |
|  | Chaoyang district | APP 3 | S-NSSAI-3 | High |
|  |  |  | S-NSSAI-2 | Medium |
|  |  |  | S-NSSAI-1 | Low |
|  |  | APP 4 | S-NSSAI-2 | High |
|  |  |  | S-NSSAI-1 | Medium |
|  |  |  | S-NSSAI-3 | Low |
| 19:00 to 7:00 | Haidian district | APP 1 | S-NSSAI-4 | High |
|  |  |  | S-NSSAI-2 | Medium |
|  |  |  | S-NSSAI-1 | Low |
|  |  | APP 2 | S-NSSAI-2 | High |
|  |  |  | S-NSSAI-3 | Medium |
|  |  |  | S-NSSAI-1 | Low |
|  | Chaoyang district | APP 3 | S-NSSAI-4 | High |
|  |  |  | S-NSSAI-1 | Medium |
|  |  |  | S-NSSAI-3 | Low |
|  |  | APP 4 | S-NSSAI-3 | High |
|  |  |  | S-NSSAI-1 | Medium |
|  |  |  | S-NSSAI-2 | Low |

It can be learned from the correspondence between the network slices and the priorities shown in Table 4 that priorities of the network slices for providing the service to the application in different regions and in different time periods may be different.

It should be understood that the first network device may alternatively obtain only priorities of the network slices for providing the service to the application in different regions, or the first network device may obtain only priorities of the network slices for providing the service to the application in different time periods. Details are not described herein again.

S220. The first network device sends the correspondence between the priorities and the network slices in the first network slice set to a second network device.

Correspondingly, the second network device receives, from the first network device, the correspondence between the network slices in the first network slice set and the priorities of the network slices for providing the service to the application.

The second network device may be a control plane network element or a data analytics network element. For example, the second network device may be the PCF network element 160 shown in FIG. 1 or the SDSF network element 180 shown in FIG. 1.

The correspondence between the network slices in the first network slice set and the priorities of the network slices for serving the application may include a correspondence between the priorities and S-NSSAI of the network slices in the first network slice set. For example, the first network device sends the correspondence shown in Table 3 or Table 4 to the second network device.

After receiving the correspondence between the network slices in the first network slice set and the priorities of the network slices for providing the service to the application, the second network device determines a correspondence between the application and a target network slice for the terminal based on the correspondence. Therefore, the terminal can update the URSP based on the received correspondence between the application and the target network slice. Therefore, in other words, the correspondence between the network slices in the first network slice set and the priorities of the network slices for providing the service to the application may be used to update the URSP on the terminal.

S230. The second network device determines, for the terminal, the target network slice of the application in the first network slice set based on the correspondence between the network slices in the first network slice set and the priorities of the network slice for providing the service to the application.

For example, the second network device may determine a network slice with a highest priority as the target network slice of the application.

Optionally, S230 may include: The second network device receives information about one or more network slices that the terminal subscribes to; and the second network device determines the target network slice in the first network slice set based on the correspondence between the priorities and the network slices in the first network slice set and the information about the network slices that the terminal subscribes to.

For example, when the first network device is a PCF network element, the first network device may obtain subscription data of the terminal from a UDM network element, where the subscription data includes the information about the network slices that the terminal subscribes to. For example, the subscription data may include S-NSSAI of the network slices that the terminal subscribes to.

For another example, when the first network device is an SDSF network element, the first network device may receive, from a PCF network element, the network slices that the terminal subscribes to. The information that is about the network slices that the terminal subscribes to and that is stored on the PCF network element may be received by the PCF network element from a UDM network element.

When the second network device determines the target network slice in the first network slice set based on the correspondence between the priorities and the network slices in the first network slice set and the information about the network slices that the terminal subscribes to, the second network device may determine, as the target network slice, a network slice with a highest priority in one or more network slices included in both the first network slice set and the network slices that the terminal subscribes to.

For example, when the correspondence between the priorities and the network slices in the first network slice set is shown in Table 3, the application is the APP 1, and S-NSSAI of the network slices that the terminal subscribes to is the S-NSSAI-2 and the S-NSSAI-3, the first network device may determine, as the target network slice, a network slice corresponding to the S-NSSAI-2 with a higher priority in the S-NSSAI-2 and the S-NSSAI-3.

If the second network device learns of a time period and a region in which the terminal uses the application, and the correspondence that is between the network slices and the priorities and that is received by the second network device from the first network device is the correspondence between the network slices and the priorities of the network slices for providing, in different time periods, the application service to the terminal in different regions, the second network device may determine, as the target network slice based on the time period and the region in which the terminal uses the application, a network slice with a highest priority in one or more network slices included in both network slices corresponding to the time period and the region and the network slices that the terminal subscribes to.

For example, when the correspondence between the priorities and the network slices in the first network slice set is shown in Table 4, the application is the APP 3, a time point at which the terminal is registered is 10:00, a region in which the terminal is located is the Chaoyang district, and S-NSSAI of the network slices that the terminal subscribes to is the S-NSSAI-2 and the S-NSSAI-3, the first network device may determine, as the target network slice, a network slice corresponding to the S-NSSAI-3 with a higher priority in the S-NSSAI-2 and the S-NSSAI-3.

S240. The second network device sends the correspondence between the application and the target network slice to the terminal. Correspondingly, the terminal receives the correspondence between the application and the target network slice from the second network device.

The correspondence between the application and the target network slice may be a correspondence between the application and S-NSSAI of the target network slice.

In S240, when the second network device is a PCF network element, the second network device may send the correspondence to the terminal by using an AMF network element. When the second network device is an SDSF network element, the SDSF network element may first send the correspondence to the PCF, and then the PCF network element sends the correspondence to the terminal.

Before sending the correspondence between the application and the target network slice to the terminal, the PCF network element may first determine whether the target network slice is the same as the network slice that is currently configured on the terminal and that corresponds to the application. If the target network slice is different from the network slice, the PCF network element sends the correspondence between the application and the target network slice to the terminal, so that the terminal updates the URSP on the terminal; or if the target network slice is the same as the network slice, the PCF network element does not send the correspondence. In this way, signaling overheads can be reduced.

When sending the correspondence between the application and the target network slice to the terminal, the AMF network element may send the correspondence in a registration accept message, or may send the correspondence in another NAS message. This is not limited in this application.

After receiving the correspondence between the application and the target network slice from the PCF network element, the terminal may update, to the target network slice, the network slice that corresponds to the application and that is in the URSP stored on the terminal, to finally update the URSP on the terminal.

In the communication method according to this embodiment of this application, the first network device obtains the priorities of the network slices for serving the application of the terminal, and sends the priorities to the second network device, then the second network device updates the URSP on the terminal based on the priorities. In this way, the terminal can select, based on the URSP, a better network slice associated with the application, thereby improving user experience.

The communication method in this embodiment of this application may be repeatedly performed. In other words, each time after updating the URSP for the terminal, the terminal determines, based on the updated URSP, the network slice corresponding to the application, and initiates session establishment by using the network slice, then the first network device and the second network device may further perform the foregoing communication method again, to update the URSP on the terminal again.

In this embodiment of this application, optionally, the second network device may obtain, based on the correspondence between the application and the target network slice, a URSP including the correspondence, and then send the URSP to the terminal, to update the URSP on the terminal.

Figure 3:
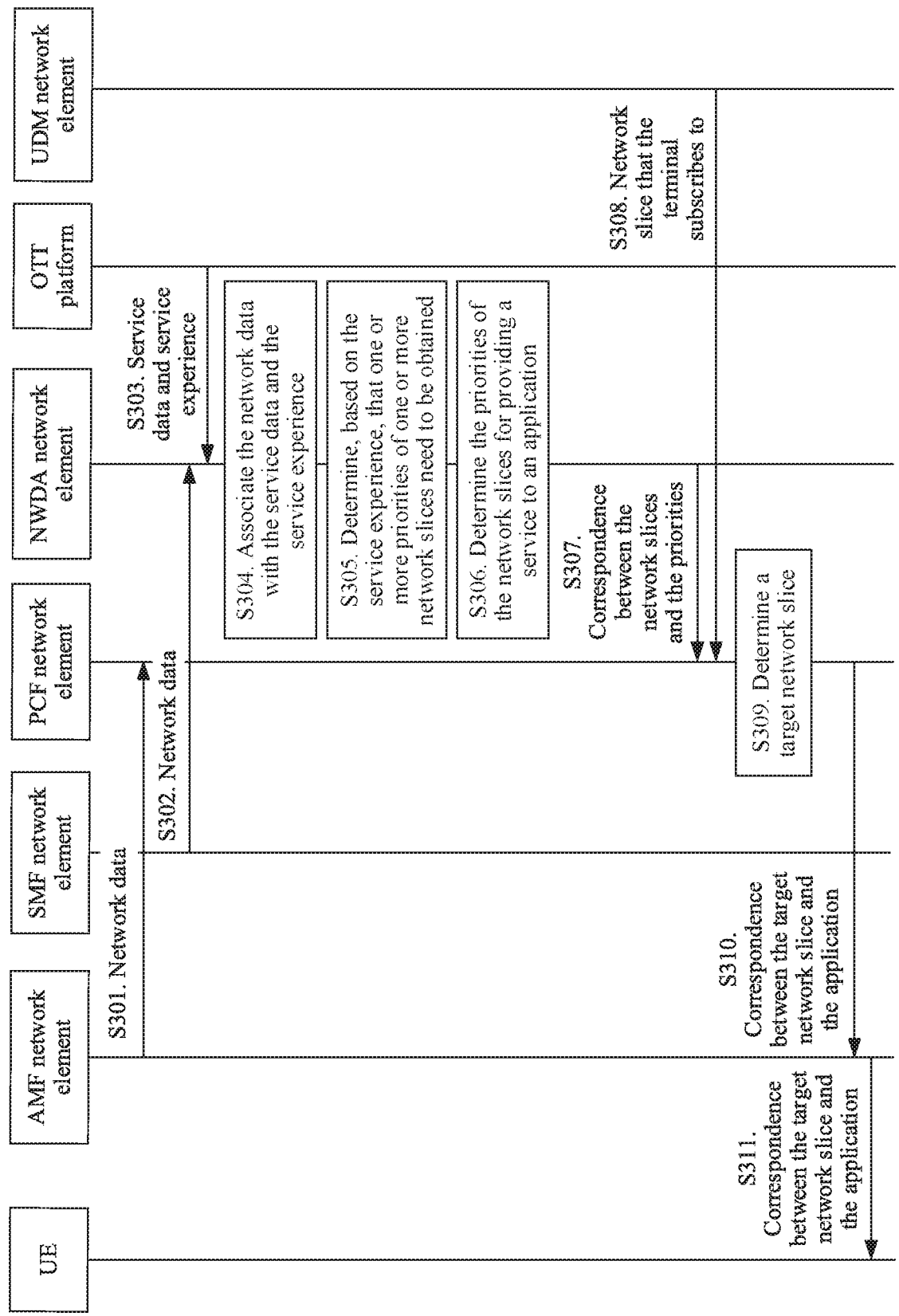
FIG. 3 is a schematic interaction diagram of a communication method according to a more specific embodiment of this application.

To better understand a communication method in an embodiment of this application, the following describes the communication method in this embodiment of this application with reference to FIG. 3 by using an example in which the first network device is an NWDA network element and the second network device is a PCF network element.

It should be understood that FIG. 3 shows steps or operations of the communication method, but these steps or operations are merely examples. In this embodiment of this application, other operations or variations of the operations in FIG. 3 may alternatively be performed. In addition, the steps in FIG. 3 may be performed in a sequence different from that presented in FIG. 3, and possibly, not all the operations in FIG. 3 need to be performed.

It should be noted that the communication method shown in FIG. 3 mainly reflects an interaction procedure between the network devices. For related technical features of each network device, refer to related operations in the communication method shown in FIG. 2. Details are not described herein again.

S301. The NWDA network element collects network data from an AMF network element.

S302. The NWDA network element collects network data from an SMF network element.

S303. The NWDA network element collects service data and service experience that are from a third-party platform. Alternatively, the service experience may be included in the service data.

S304. The NWDA network element associates the network data with the service data and the service experience.

S305. The NWDA network element determines, based on the associated data, that a network slice currently configured for the terminal needs to be updated. In other words, one or more service priorities of one ore more network slices need to be determined for an application of the terminal.

S306. The NWDA network element obtains service capabilities of the network slices in a network, and determines, based on the service capabilities, the priorities of the network slices for providing a service to the application.

S307. The NWDA network element sends, to the PCF network element, a correspondence between the network slices and the priorities of the network slices for serving the application.

Correspondingly, the PCF network element receives the correspondence.

S308. After the terminal initiates a registration procedure, the PCF network element obtains, from a UDM network element, information about one or more network slices that the terminal subscribes to.

S309. The PCF network element determines a target network slice of the application based on the correspondence between the network slices and the priorities of the network slices for serving the application and the information about the network slices that the terminal subscribes to.

S310. When the target network slice is different from the network slice that corresponds to the application and that is currently configured on the terminal, the PCF network element sends a correspondence between the application and the target network slice to the AMF network element, to update a URSP on the terminal.

S311. The AMF network element sends the correspondence between the application and the target network slice to the terminal, to update the URSP on the terminal.

Figure 4A:
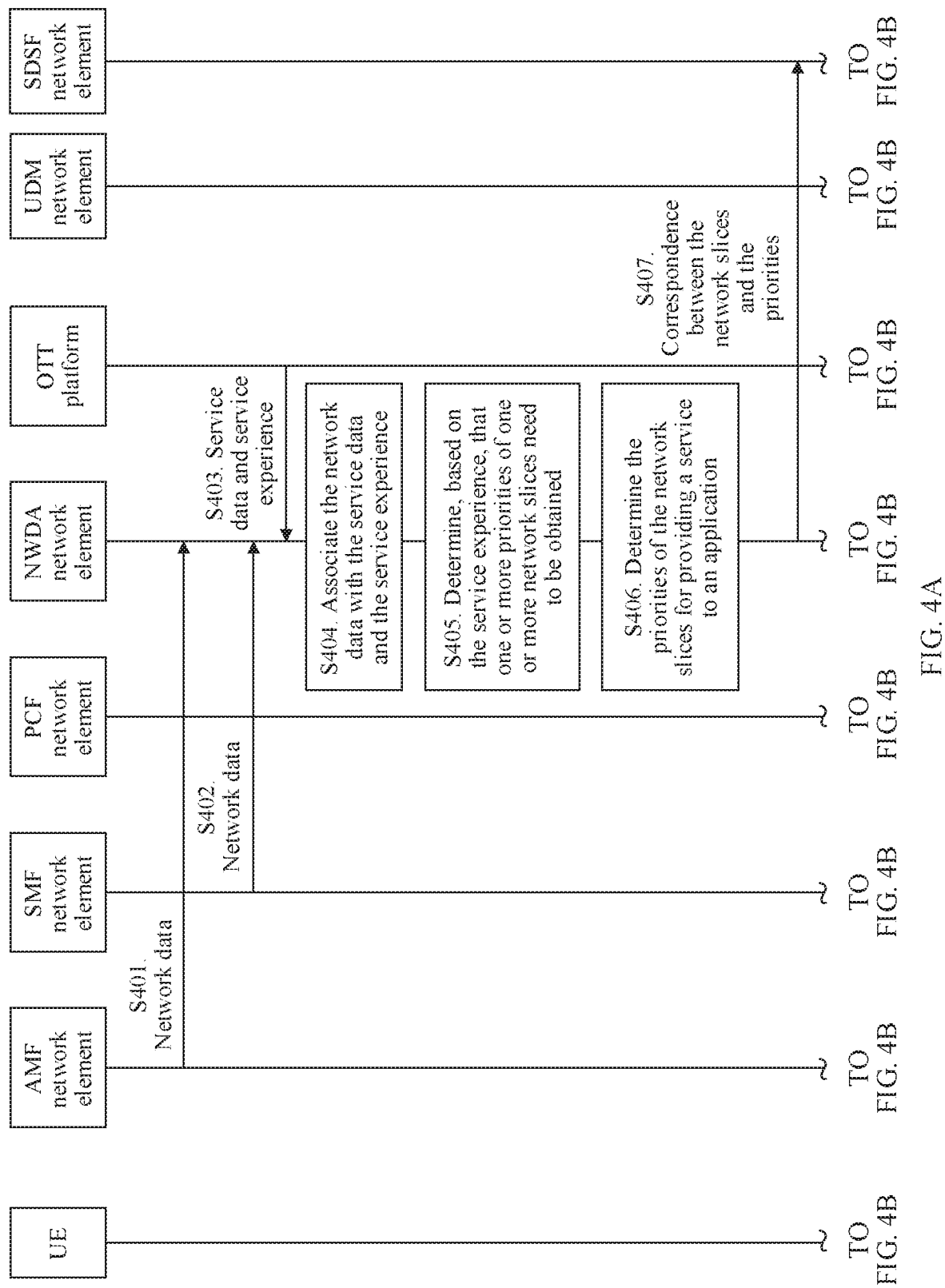

The following describes a communication method in an embodiment of this application with reference to FIG. 4A and FIG. 4B by using an example in which the first network device is an NWDA network element and the second network device is an SDSF network element.

It should be understood that FIG. 4A and FIG. 4B shows steps or operations of the communication method, but these steps or operations are merely examples. In this embodiment of this application, other operations or variations of the operations in FIG. 4A and FIG. 4B may alternatively be performed. In addition, the steps in FIG. 4A and FIG. 4B may be performed in a sequence different from that presented in FIG. 4A and FIG. 4B, and possibly, not all the operations in FIG. 4A and FIG. 4B need to be performed.

It should be noted that the communication method shown in FIG. 4A and FIG. 4B mainly reflects an interaction procedure between the network devices. For related technical features of each network device, refer to related operations in the communication method shown in FIG. 4A and FIG. 4B. Details are not described herein again.

For S401 to S406, refer to S301 to S306. Details are not described herein again.

S407. The NWDA network element sends, to the SDSF network element, a correspondence between the network slices and the priorities of the network slices for serving the application.

S408. After the terminal initiates a registration procedure, the PCF network element obtains, from a UDM network element, information about one or more network slices that the terminal subscribes to.

S409. The PCF network element sends, to the SDSF network element, the information about the network slices that the terminal subscribes to.

S410. The SDSF network element determines a target network slice of the application based on the correspondence between the network slices and the priorities of the network slices for serving the application and the information about the network slices that the terminal subscribes to.

S411. The SDSF network element sends a correspondence between the application and the target network slice to the PCF network element.

S412. When the target network slice is different from the network slice that corresponds to the application and that is currently configured on the terminal, the PCF network element sends the correspondence between the application and the target network slice to the AMF network element, to update a URSP on the terminal.

S413. The AMF network element sends the correspondence between the application and the target network slice to the terminal, to update the URSP on the terminal.

Figure 5:
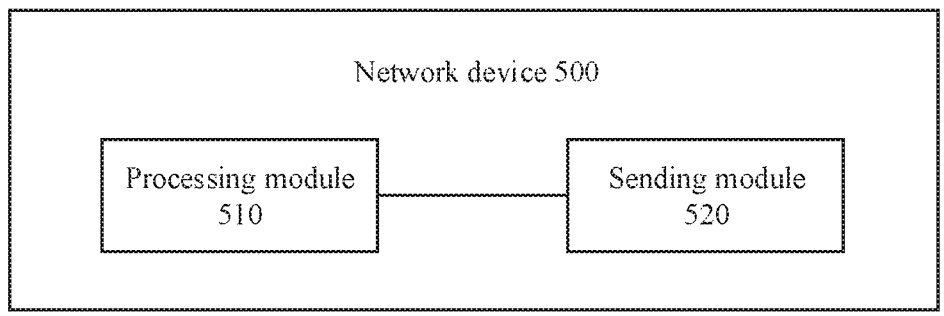
FIG. 5 is a schematic structural diagram of a network device according to an embodiment of this application.

FIG. 5 is a schematic structural diagram of a network device according to an embodiment of this application. It should be understood that a network device 500 shown in FIG. 5 is merely an example. The network device in this embodiment of this application may further include another module or unit, or include a module with a function similar to that of each module in FIG. 5, or may not necessarily include all modules in FIG. 5.

The network device 500 may include a processing module 510 and a sending module 520.

The processing module 510 is configured to obtain one or more priorities of one or more network slices in a first network slice set for providing a service to an application.

The sending module 520 is configured to send a correspondence between the priorities and the network slices in the first network slice set to a second network device, where the correspondence is used to update a terminal route selection policy on a terminal.

Optionally, the processing module 510 is specifically configured to: obtain service experience of a first network slice serving the application; and obtain the priority if the service experience is less than or equal to a service experience threshold.

Optionally, the processing module 510 is specifically configured to: determine the first network slice set associated with the application; and determine the priorities based on service capabilities of the network slices in the first network slice set.

Optionally, the correspondence is a correspondence between the priorities and network slice selection assistance information of the network slices in the first network slice set.

Optionally, the network device is a network data analytics network element, and the second network device is a control plane network element or a database network element.

It should be understood that the network device 500 may be configured to perform the steps performed by the first network device in the communication method shown in any one of FIG. 2 to FIG. 4A and FIG. 4B. For brevity, details are not described herein again.

Figure 6:
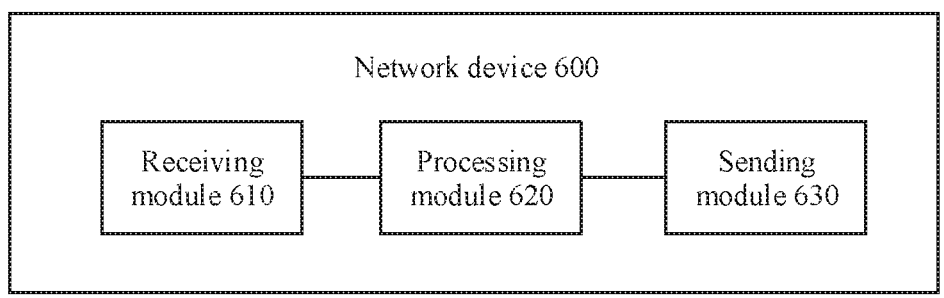
FIG. 6 is a schematic structural diagram of a network device according to an embodiment of this application.

FIG. 6 is a schematic structural diagram of a network device according to an embodiment of this application. It should be understood that a network device 600 shown in FIG. 6 is merely an example. The network device in this embodiment of this application may further include another module or unit, or include a module with a function similar to that of each module in FIG. 6, or may not necessarily include all modules in FIG. 6.

The network device 600 may include a receiving module 610, a processing module 620, and a sending module 630.

The receiving module 610 is configured to receive, from a first network device, a correspondence between one or more network slices in a first network slice set and one or more priorities of the network slices for providing a service to an application.

The processing module 620 is configured to determine, for a terminal, a target network slice of the application in the first network slice set based on the correspondence between the priorities and the network slices in the first network slice set.

The sending module 630 is configured to send a correspondence between the application and the target network slice to the terminal, where the correspondence between the application and the target network slice is used by the terminal to update a terminal route selection policy on the terminal.

Optionally, the processing module 620 is specifically configured to: receive information about one or more network slices that the terminal subscribes to; and determine the target network slice in the first network slice set based on the correspondence between the priorities and the network slices in the first network slice set and the information about the subscribed network slices.

Optionally, the processing module 620 is specifically configured to determine, as the target network slice, a network slice with a highest priority in one or more network slices included in both the first network slice set and the network slices that the terminal subscribes to.

Optionally, the correspondence between the priorities and the network slices in the first network slice set is a correspondence between the priorities and network slice selection assistance information of the network slices in the first network slice set; and the correspondence between the application and the target network slice is a correspondence between the application and network slice selection assistance information of the target network slice.

Optionally, the first network device is a network data analytics network element, and the network device is a control plane network element or a database network element.

It should be understood that the network device 600 may be configured to perform the steps performed by the second network device in the communication method shown in any one of FIG. 2 to FIG. 4A and FIG. 4B. For brevity, details are not described herein again.

Figure 7:
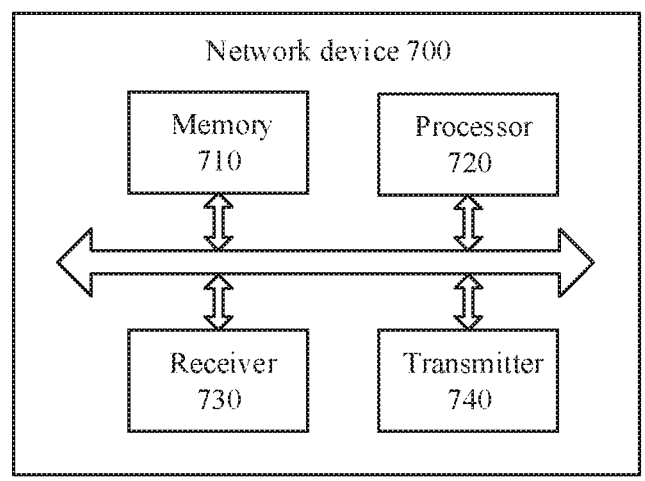
FIG. 7 is a schematic structural diagram of a network device according to another embodiment of this application.

FIG. 7 is a schematic structural diagram of a network device according to another embodiment of this application. It should be understood that a network device 700 shown in FIG. 7 is merely an example. The network device in this embodiment of this application may further include another module or unit, or include a module with a function similar to that of each module in FIG. 7, or may not necessarily include all modules in FIG. 7.

The network device 700 may include a processor 720 and a transmitter 740. Optionally, the network device may further include a memory 710 and a receiver 730.

The memory 710 is configured to store data and program code. The processor 720 is configured to implement operations or steps performed by the processing module 510 in FIG. 5. The transmitter 740 is configured to implement operations or steps performed by the sending module 520 in FIG. 5. The receiver 730 is configured to receive information sent by another device.

The memory 710 may be integrated into the processor 720. The receiver 730 and the transmitter 740 may be integrated together and collectively referred to as a transceiver.

Figure 8:
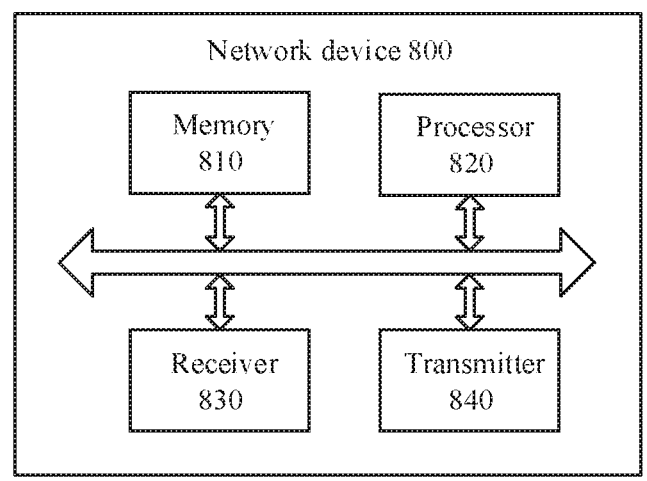
FIG. 8 is a schematic structural diagram of a network device according to another embodiment of this application.

FIG. 8 is a schematic structural diagram of a network device according to another embodiment of this application. It should be understood that a network device 800 shown in FIG. 8 is merely an example. The network device in this embodiment of this application may further include another module or unit, or include a module with a function similar to that of each module in FIG. 8, or may not necessarily include all modules in FIG. 8.

The network device 800 may include a receiver 830, a processor 820, and a transmitter 840. Optionally, the network device may further include a memory 810.

The memory 810 is configured to store data and program code. The processor 820 is configured to implement operations or steps performed by the processing module 620 in FIG. 6. The transmitter 840 is configured to implement operations or steps performed by the sending module 630 in FIG. 6. The receiver 830 is configured to perform steps or operations performed by the receiving module 610 in FIG. 6.

The memory 810 may be integrated into the processor 820. The receiver 830 and the transmitter 840 may be integrated together and collectively referred to as a transceiver.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
    obtaining, by a first network device, one or more priorities of one or more network slices in a network slice set for providing a service to an application, wherein the obtaining, by the first network device, the one or more priorities of the one or more network slices in the network slice set for providing the service to the application comprises:
        obtaining, by the first network device, service experience of a network slice serving the application; and
        obtaining, by the first network device, the one or more priorities if the service experience is less than or equal to a service experience threshold;
    sending, by the first network device, a correspondence between the one or more priorities and the one or more network slices in the network slice set to a second network device;
    receiving, by the second network device, from the first network device, the correspondence;
    determining, by the second network device for a terminal, a target network slice of the application in the network slice set based on the correspondence between the one or more priorities and the one or more network slices in the network slice set; and
    sending, by the second network device, a correspondence between the application and the target network slice to the terminal, wherein a terminal route selection policy on the terminal is updated based on the correspondence between the application and the target network slice.

2. The communication method according to claim 1, wherein the obtaining, by the first network device, the one or more priorities comprises:
    determining, by the first network device, the network slice set associated with the application; and
    determining, by the first network device, the one or more priorities based on service capabilities of the one or more network slices in the network slice set.

3. The communication method according to claim 1, wherein the correspondence between the one or more priorities and the one or more network slices in the network slice set is a correspondence between the one or more priorities and network slice selection assistance information of the one or more network slices in the network slice set.

4. The communication method according to claim 1, wherein the first network device is a network data analytics network element.

5. The communication method according to claim 1, wherein the second network device is a control plane network element or a database network element.

6. The communication method according to claim 1, wherein the determining, by the second network device for a terminal, a target network slice of the application in the network slice set based on the correspondence between the one or more priorities and the one or more network slices in the network slice set comprises:
    receiving, by the second network device, information about one or more network slices that the terminal subscribes to; and
    determining, by the second network device, the target network slice in the network slice set based on the correspondence between the one or more priorities and the one or more network slices in the network slice set and the information about the one or more network slices that the terminal subscribes to.

7. The communication method according to claim 6, wherein the determining, by the second network device, a target network slice of the application in the network slice set based on the correspondence between the one or more priorities and the one or more network slices in the network slice set comprises:
    determining, by the second network device, as the target network slice, a network slice with a highest priority in one or more network slices comprised in both the network slice set and the one or more network slices that the terminal subscribes to.

8. The communication method according to claim 3, wherein
the correspondence between the application and the target network slice is a correspondence between the application and network slice selection assistance information of the target network slice.

9. A first network device, comprising:
at least one processor;
a non-transitory computer-readable storage medium coupled to the at least one processor and storing programming instructions for execution by the at least one processor, wherein the programming instructions cause the first network device to:
obtain one or more priorities of one or more network slices in a network slice set for providing a service to an application by operations comprising:
obtaining service experience of a network slice serving the application; and
obtaining the one or more priorities if the service experience is less than or equal to a service experience threshold; and
send a correspondence between the one or more priorities and the one or more network slices in the network slice set to a second network device, wherein a target network slice of the application in the network slice set is determined by the second network device based on the correspondence between the one or more priorities and the one or more network slices in the network slice set, and a terminal route selection policy on a terminal is updated based on a correspondence between the application and the target network slice.

10. The first network device according to claim 9, wherein the programming instructions further cause the first network device to:
determine the network slice set associated with the application; and
determine the one or more priorities based on service capabilities of the one or more network slices in the network slice set.

11. The first network device according to claim 9, wherein the correspondence is a correspondence between the one or more priorities and network slice selection assistance information of the one or more network slices in the network slice set.

12. The first network device according to claim 9, wherein the first network device is a network data analytics network element, and the second network device is a control plane network element or a database network element.

13. A second network device, comprising:
at least one processor; and
a non-transitory computer-readable storage medium coupled to the at least one processor and storing programming instructions for execution by the at least one processor, wherein the programming instructions cause the second network device to:
receive, from a first network device, a correspondence between one or more network slices in a network slice set and one or more priorities of the one or more network slices for providing a service to an application, wherein the one or more priorities are obtained if service experience of a network slice serving the application is less than or equal to a service experience threshold;
determine, for a terminal, a target network slice of the application in the network slice set based on the correspondence between the one or more priorities and the one or more network slices in the network slice set; and
send a correspondence between the application and the target network slice to the terminal, wherein a terminal route selection policy on the terminal is updated based on the correspondence between the application and the target network slice.

14. The second network device according to claim 13, wherein the programming instructions further cause the second network device to:
receive information about one or more network slices that the terminal subscribes to; and
determine the target network slice in the network slice set based on the correspondence between the one or more priorities and the one or more network slices in the network slice set and the information about the one or more network slices that the terminal subscribes to.

15. The second network device according to claim 14, wherein the programming instructions further cause the second network device to:
determine, as the target network slice, a network slice with a highest priority in one or more network slices comprised in both the network slice set and the one or more network slices that the terminal subscribes to.

16. The second network device according to claim 13, wherein the correspondence between the one or more priorities and the one or more network slices in the network slice set is a correspondence between the one or more priorities and network slice selection assistance information of the one or more network slices in the network slice set; and
the correspondence between the application and the target network slice is a correspondence between the application and network slice selection assistance information of the target network slice.

17. The second network device according to claim 13, wherein the first network device is a network data analytics network element, and the second network device is a control plane network element or a database network element.

* * * * *